United States Patent [19]
Nakasuji et al.

[11] Patent Number: 4,486,566
[45] Date of Patent: Dec. 4, 1984

[54] ROOM TEMPERATURE-CURABLE POLYORGANOSILOXANE COMPOSITIONS HAVING RESISTANCE TO SOILING

[75] Inventors: Katsuyoshi Nakasuji, Ichihara; Toshio Saruyama, Narashino, both of Japan

[73] Assignee: Toray Silicone Co., Ltd., Tokyo, Japan

[21] Appl. No.: 471,373

[22] Filed: Mar. 1, 1983

[30] Foreign Application Priority Data

Mar. 1, 1982 [JP] Japan ................................ 57/31964

[51] Int. Cl.³ .......................... C08K 5/42; C08L 83/04
[52] U.S. Cl. ..................................... 524/788; 524/425; 524/585; 524/861; 524/862; 524/864; 524/865; 524/866; 528/10; 528/14; 528/17; 528/22; 528/23; 528/30; 528/40
[58] Field of Search ....................... 528/10, 14, 17, 22, 528/23, 30; 524/425, 861, 862, 864, 865, 866, 788, 585

[56] References Cited

U.S. PATENT DOCUMENTS 3,507,897 4/1970 Kanner et al. ................... 260/448.2
3,997,580 12/1980 Morehouse ......................... 252/8.7
4,267,213 5/1981 Beck et al. ........................... 428/446
4,352,742 10/1982 Davis et al. ............................ 528/27

FOREIGN PATENT DOCUMENTS 76452 6/1981 Japan .
76453 6/1981 Japan .

Primary Examiner—Herbert J. Lilling
Attorney, Agent, or Firm—Roger H. Borrousch

[57] ABSTRACT

A composition curable at room temperature has resistance to soiling and maintains its adhesion to substrates when cured. The composition is the product obtained by mixing a polyorganosiloxane having at least two silicon-bonded hydroxyl radicals or two silicon-bonded hydrolyzable groups per molecule, a crosslinking organosilicon compound containing at least two silicon-bonded hydrolyzable groups, and an organosulfonate-containing silicon compound.

20 Claims, No Drawings

ROOM TEMPERATURE-CURABLE POLYORGANOSILOXANE COMPOSITIONS HAVING RESISTANCE TO SOILING

BACKGROUND OF THE INVENTION

1. Field of the Invention

This invention concerns room temperature-curable polyorganosiloxane compositions. More precisely, this invention concerns room temperature-curable polyorganosiloxane compositions which are characterized by the fact that the postcure surface is not easily soiled and the area near the substrate, with which the cured product is in contact, is not contaminated.

2. Description of the Prior Art

Conventionally, room temperature-curable polyorganosiloxane compositions, especially polyorganosiloxane compositions which form rubbery substances after curing at room temperature, have been widely used as electric insulating materials, mold making materials, gaskets, and sealants. However, dust is easily adhered or adsorbed when these room temperature-curable polyorganosiloxanes are used in the above-mentioned applications. In particular, when used as architectural sealants on building exteriors, liquid polyorganosiloxane slowly migrates from the cured silicone rubber onto the surrounding building wall surface which absorbs the stain and the building's appearance deteriorates. One method for overcoming these drawbacks is the addition to the composition of a surfactant such as a polyoxyalkylene compound or its copolymer with an organopolysiloxane (cf. Japan Kokai Patent No. Sho 56 [1981]-76453 and Japan Kokai Patent No. Sho 56[1981]-76452). In these methods, when a surfactant is added in an amount adequate for the prevention of soiling, the adhesiveness, an essential characteristic of an architectural sealant, is significantly impaired. Also, the weather resistance of polyether bonds is poor and when these materials are used outdoors and exposed to direct sunlight the soiling prevention effect is rapidly reduced.

The inventors earnestly pursued the present study in an attempt to overcome the drawbacks of conventionally known room temperature-curable polyorganosiloxane compositions that are easily soiled. This invention was achieved as a result.

Summary of the Invention

The purpose of this invention is to offer room temperature-curable polyorganosiloxane composition with the following characteristics: the postcure surface is not easily soiled, the area near the substrate, with which the cured product is in contact is not contaminated and the adhesion is excellent.

This invention relates to a polyorganosiloxane composition comprising the product obtained by mixing (A) 100 parts by weight of a polyorganosiloxane having at least two silicon-bonded hydroxyl radicals or at least two silicon-bonded hydrolyzable groups per molecule, (B) an amount of an organosilicon compound sufficient to make the composition room temperature curable, said organosilicon compound having at least two silicon-bonded hydrolyzable groups per molecule, where the total number of silicon-bonded hydroxyl radicals or silicon-bonded hydrolyzable groups per molecule in the polyorganosiloxane of (A) and silicon-bonded hydrolyzable groups per molecule of (B) exceeds 4.0, and (C) 0.5 to 50 parts by weight of an organosulfonate- containing silicon compound.

Component (A) of the room temperature-curable polyorganosiloxane compositions of this invention can be linear, branched chain, or network molecular configuration. At least two silanol groups or silicon-bonded hydrolyzable groups are required per molecule in order to complete the curing process. The terms "silanol group" or "silanol groups" as used in this description shall mean silicon-bonded hydroxyl radical, Si-OH. These groups can be present at the ends of the polyorganosiloxane or on side chains or both. From the standpoint of the postcure physical properties, they are preferably present at the ends of the molecular chain.

The polyorganosiloxane has silicon-bonded organic radicals, where examples are as follows: alkyl radicals such as methyl, ethyl, propyl, and n-octyl; alkenyl radicals such as vinyl and allyl; aryl radicals such as phenyl and naphthyl; cycloalkyl radicals such as cyclohexyl and cycloheptyl; halogenated alkyl radicals such as 3-chloropropyl and 3,3,3-trifluoropropyl and aralkyl radicals such as 2-phenyl-ethyl and 2-phenylpropyl. Only one type of these organic radicals may be present in the molecule or mixtures of two or three types may be present. Preferably, the organic radicals of the polyorganosiloxane of (A) are methyl or combinations of methyl and other radicals. The preferred polyorganosiloxanes are polydiorganosiloxanes, especially the hydroxyl endblocked polydimethylsiloxanes. The viscosity of this component at 25° C. is not critical, but a component with a viscosity ranging from 0.0003 to 0.3 $m^2/s$ is generally preferred. The preferred polydiorganosiloxanes have a viscosity at 25° C. in the range of 0.001 to 0.05 $m^2/s$. The groups present in (A) which participate in the crosslinking reaction are normally silanol groups. However silicon-bonded hydrolyzable groups are also applicable. Silicon-bonded hydrolyzable groups are functional groups which are capable of generating silanol groups by hydrolysis. Conventionally known functional groups are applicable. Examples of these functional groups are alkoxy, acyloxy, amino, amide, aminoxy, oxime, and alkenoxy. The details will be explained with reference to the silicon-bonded hydrolyzable groups in component (B).

The organosilicon compound containing on average at least two silicon-bonded hydrolyzable groups per molecule, component (B), is an essential component for the formation of a network structure by condensation with the silanol groups of (A), or silanol groups in (A) which have been produced by the hydrolysis of silicon-bonded hydrolyzable groups, i.e. for the curing of the compositions of this invention. If (A) contains two silanol groups or silicon-bonded hydrolyzable groups per molecule, more than an average of two silicon-bonded hydrolyzable groups are required in (B). Therefore, it would be important that an organosilicon compound molecule possessing three or more silicon-bonded hydrolyzable groups per molecule be present in (B). If (A) contains three or more silanol groups per molecule, the presence of an average of two silicon-bonded hydrolyzable groups per molecule of (B) is sufficient. Of course, in the latter case, an organosilicon compound containing three or more silicon-bonded hydrolyzable groups per molecule can be present in (B). Component (B) can be used in the form of a single type, as a mixture of two or more types possessing different numbers of silicon-bonded hydrolyzable groups per molecule or as a mixture of two or more types possessing different types of silicon-bonded hydrolyzable groups.

The hydrolyzable groups in (B) are not critical, as long as, they are functional groups which can produce silanol groups by hydrolysis. Examples of these groups are as follows: alkoxy, acyloxy, alkenoxy, amino, ketoxime, aminoxy, and amido. Examples of the alkoxy groups are methoxy, ethoxy, n-propxy, isopropoxy, and methoxyethoxy. Examples of the acyloxy groups are acetoxy, octanoyloxy, and benzoyloxy. Examples of the alkenoxy groups are propenoxy, isopropenoxy, butenoxy, and 5,5-dimethylcylohexa-1-one-3-yloxy. Examples of the amino groups are N,N-diethylamino, N-ethylamino, N-propylamino, N-butylamino, N-cyclohexylamino, and N,N-methylcyclohexylamino. A ketoximo group is bonded to silicon via its oxygen and examples are dimethylketoximo, methylethylketoximo, diethylketoximo, and butanoximo groups. An aminoxy group is bonded to silicon via its oxygen and examples are N,N-dimethylaminoxy, N,N-methylethylaminoxy, and N,N-diethylaminoxy. An amide group is bonded to silicon via its nitrogen and examples are N-methylacetamido, N-ethylacetamido, N-butylacetamido, and ε-caprolactamido. The hydrolyzable silicon-bonded groups in each molecule of (B) can be identical or two or more different functional groups can be present. Moreover, these functional groups can be bonded to the same or the different silicon atoms.

The other atomic valences of the silicon atom in (B) which are not filled by the above-mentioned hydrolyzable groups are satisfied by the carbon atoms of substituted or unsubstituted hydrocarbon radicals or by oxygen atoms in siloxane bonds. Generally, monovalent hydrocarbon radicals are used; however, divalent or higher valent hydrocarbon radicals are also applicable. Examples of the monovalent unsubstituted hydrocarbon radicals are as follows: alkyl radicals such as methyl, ethyl, propyl, and octyl; alkenyl radicals such as vinyl and allyl; and aryl radicals such as phenyl and naphthyl. Examples of the monovalent subsituted hydrocarbon radicals are as follows; halogenated hydrocarbon radicals such as chloromethyl, 3-chloropropyl, and 3,3,3-trifluoropropyl; amino-substituted hydrocarbon radicals such as 3-aminopropyl and N-2-aminoethyl-3-aminopropyl; epoxy-substituted hydrocarbon radicals such as 3-glycidylpropyl; mercapto-substituted hydrocarbon radicals such as 3-mercaptopropyl; ester-substituted hydrocarbon radicals such as 2-acetoxy ethyl and 3-methacryloxypropyl; and ether-substituted hydrocarbon radicals such as 2-methoxyethyl. Two or more silicon atoms can be bonded to divalent or higher valent hydrocarbon radicals. A silane monomer is the most common (B). However, polysiloxanes with low degrees of polymerization are also commonly used.

Component (B) is selected as a single type or as mixture of multiple types from the above-mentioned organosilicon compounds according to the applications an purposes of the compositions. For example, alkoxy-containing silicon compounds selected from among tetraethyl silicate, tetra(n-propyl) silicate, and ethyl polysilicate can be used in order to increase the curing rate and obtain homogeneous curing characteristics. In order to obtain a low modulus and high ductility silicone rubber, a combination of several types of methylcylosiloxanes containing 2 to 4 N,N-diethylaminoxy groups per molecule may be appropriately used. In order to obtain a single package room temperature-curable composition, that is, compositions which can be stored in the uncured state in a sealed container for long periods and which cure when extruded into the atmosphere, methyltriacetoxysilane, vinlytriacetoxysilane and ethyltriacetoxysilane are applicable. In order to obtain a single package room temperature-curable composition which does not corrode iron and substrates, the following compounds are applicable: methyltri(cyclohexylamino)silane, methyltri(dimethylketoximo)silane, vinyltri(dimethylketoximo)silane, vinyltri(methylethylketoximo)silane, methyltri(isopropenoxy)silane, vinyltri(isopropenoxy)silane, and methyltri(N-ethylacetamido)silane. In order to obtain a single package composition which cures to a low modulus, high ductility silicone rubber, combinations of the above-mentioned organosilanes or organopolysiloxanes containing 3 to 4 hydrolyzable silicon-bonded groups per molecule with the following compounds are applicable: dimethyldi(N-methylacetamido)silane, methylvinyldi(N-methylacetamido)silane, dimethyldi(N,N-diethylaminoxy)silane, methylvinyldi(N,N-diethylaminoxy)silane, or methylvinyldi(N-cyclohexylamino)-silane Component (B) is added in an amount sufficient to carry out the room temperature curing of the compositions of this invention. The amount depends upon the number and types of functional groups and the molecular weights of (A) and (B). If (A) possesses three or more hydrolyzable silicon-bonded groups per molecule, the addition of (B) is unnecessary. However, the addition of (B) is essential if (A) is selected from among compounds which are not specified as above. In this case, it is desirable to add (B) in an amount such that silicon-bonded hydrolyzable groups are present in an equivalent amount which exceeds the amount of silanol groups or silicon-bonded hydrolyzable groups in (A). If the quantity of addition falls below this range, curing is insufficient and the postcured mechanical properties are impaired.

Component (C) is the characteristic component of this invention. It functions in the compositions of this invention to prevent contamination of the cured product itself. Also, if the cured product is a rubber and is used as a sealant, contamination of the substrate around the sealant is prevented. This function is achieved because (C) simultaneously exhibits both hydrophilicity due to the presence of the organosulfonate group and an affinity for (A) due to the presence of other organic groups. "Organosulfonate group" implies that the sulfonate group is bonded to a silicon atom through an organic group. Typical examples of this component are organosulfonate-containing silanes and organosulfonate-containing polysiloxanes. Typical examples of the organosulfonate-containing silanes are organosilanes expressed by the formula $$M(O_3S-R-SiR_3^1)_x$$

where M represents a monovalent or divalent metal ion; R represents divalent organic radical in which a hydroxyl radical is bonded to the carbon atom adjacent to the carbon atom bonded to the sulfur atom of the sulfonate group; $R^1$ represent monovalent hydrocarbon radicals, halogenated monovalent hydrocarbon radicals, hydrocarbonoxy radicals or the hydroxyl radical and x is a value equal to the ionic valence of the metal ion M. Typical examples of organosulfonate-containing polysiloxanes are organopolysiloxanes containing at least one siloxane unit per molecule as expressed by the formula

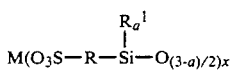

where M, R, $R^1$, and x retain their definitions from above and a is 0, 1, or 2.

Example of the above-mentioned M, R, and $R^1$ are as follows. Examples of the monovalent metal ion M are the lithium, sodium, potassium, and cesium ions. Examples of the divalent metal ion M are the magnesium, calcium, strontium, barium, zinc, copper, tin, iron, cobalt, and nickel ions. In terms of contamination prevention, the sodium and potassium ions are the most preferred. Examples of the divalent organic radicals R are $C_{2-18}$ alkylene, cycloalkylene, alkyleneoxyalkylene, and cycloalkyleneoxyalkylene radicals. Examples of the alkylene radicals are

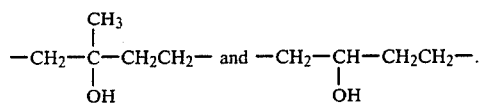

Examples of the cycloalkylene radicals are

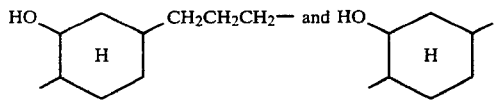

Examples of the alkyleneoxyalkylene radicals are

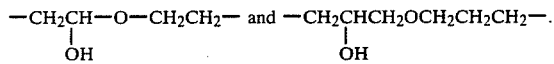

An example of the cycloalkyleneoxyalkylene radical is

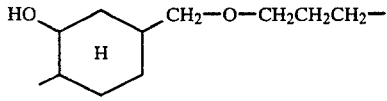

in these examples, the sulfur atom in the sulfonate groups is bonded to the β-carbon atom relative to the OH group and the carbon atom at the right and is bonded to a silicon atom. Examples of the monovalent hydrocarbon $R^1$ radicals are alkyl radicals such as methyl, ethyl, propyl, and hexyl; cycloalkyl radical such as cyclohexyl and cycloheptyl; alkenyl radicals such as vinyl and allyl; aryl radicals such as phenyl and naphthyl and aralkyl radicals such as benzyl and 2-phenylethyl. Examples of the halogenated monovalent hydrocarbon radicals are 3-chloropropyl and 3,3,3-trifluoropropyl. Examples of the hydrocarbonoxy radicals are alkoxy radicals such as methoxy, ethoxy, and n-proponoxy and aryloxy radicals such as phenoxy. The identical or different $R^1$ radicals may be bonded to the same silicon atom.

In addition to the siloxane unit expressed by the formula

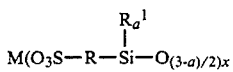

the organosulfonate-containing polysiloxanes can contain a siloxane unit expressed by the formula

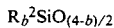

where $R^2$ represents unsubstituted or substituted monovalent hydrocarbon radicals, (excluding organosulfonate groups), hydrocarbonoxy radicals, or the hydroxyl radical and b is 0, 1, 2, or 3.

The same unsubstituted monovalent hydrocarbon radicals defined for $R^1$ can be selected as examples of the unsubstituted monovalent hydrocarbon $R^2$ radicals. Examples of the substituted monovalent hydrocarbon $R^2$ radicals are as follows: halogenated monovalent hydrocarbon radicals such as 3-chloropropyl and 3,3,3-trifluoropropyl; epoxysubstituted hydrocarbon radicals such as 3-glycidylpropyl and 3-(3',4'-epoxycyclohexyl)propyl; mercapto-substituted hydrocarbon radicals such as 3-mercaptopropyl; ester-substituted hydrocarbon radicals such as 3-methacryloxypropyl, 3-acryloxypropyl, and 3-propionyloxyethyl; ether-substituted hydrocarbon radicals such as 2-methoxyethyl and hydroxyl-substituted hydrocarbon radicals such as 3-hydroxypropyl.

Identical or different $R^2$ radicals can be bonded to the same silicon atom. Only one type of metal ion M may be present in a molecule of the organosulfonate-containing polysiloxane or different types may be present as a mixture. The polysiloxane's degree of polymerization is 2 or greater. The molecular configuration may be linear chain, branched chain, cyclic, and network. These organosulfonate-containing silanes or organosulfonate-containing polysiloxanes are easily prepared by the following method as disclosed in U.S. Pat. No. 3,507,897 which is hereby incorporated by reference to further exemplify the organosulfonate-containing silanes and siloxanes and their preparation. An epoxy-containing organosilane or an epoxy-containing organopolysiloxane and sodium bisulfite or potassium bisulfite are mixed in an aqueous system with heating and the epoxy group opens with simultaneous addition of sodium sulfonate or potassium sulfonate. To convert the organosulfonates to the divalent metal salts, the sodium or potassium is substituted with a divalent metal by introducing an aqueous divalent metal salt solution.

Component (C) is not limited to those mentioned above. Components in which only one sulfonate group is bonded to the silicon-bonded organic group or in which multiple numbers of OH groups and multiple numbers of sulfonate groups are bonded to the same silicon-bonded organic group are also applicable.

Component (C) is added at 0.5 to 50 parts by weight and preferably 1.0 to 20 parts by weight relative to 100 parts by weight of (A). If too little is added, the prevention of soiling in and around the cured product is poor. On the other hand, if too much is added, the physical characteristics of the cured product are impaired.

The compositions of this invention can be produced by simply mixing components (A) to (C) to homogeneity. If an appropriate compound is selected as component (B) and the components are mixed in a moisture-free container, a single package room temperature-curable polyorganosiloxane composition is prepared. If components (A) and (B) are packaged separately, a two package room temperature-curable polyorganosiloxane composition may be produced which is mixed immediately before curing.

If desirable, a variety of inorganic fillers can be added and mixed into the compositions of this invention in addition to components (A) to (C). These inorganic fillers can impart the required mechanical strength and hardness to the cured product and also can impart the appropriate fluidity required by the application process to the polyorganosiloxane compositions prior to curing. Examples of the fillers are fumed silica, precipitated silica, silica aerogel, finely powdered silica, diatomaceous earth, calcium carbonate, and titanium oxide. The quantity of inorganic filler to be added depends upon the type of filler, workability in the uncured state and physical properties required of the cured product. When used as sealants, the quantity of addition generally ranges from 10 to 300 parts by weight per 100 parts by weight of (A).

If desirable, a curing accelerating catalyst can be added to the compositions of this invention. The curing accelerating catalyst can be added in advance to a mixture of components (A) to (C) or can be packaged separately and added immediately before curing. Metal salts of carboxylic acids and metal alcoholates are normally used as curing accelerating catalysts. Examples of metal carboxylates are as follows: dibutyltin diacetate, dibutyltin dioctoate, dibutyltin dilaurate, tin octoate, iron octoate, and zinc octoate. Examples of metal alcoholates are as follows: tetra-n-butyl titanate, tetra-i-propyl titanate, tetraoctyl titanate, aluminum triethoxide, aluminum tributoxide, dipropyl titanate bis(acetylacetonate), and dibutyl titanate bis(ethylacetoacetate).

The compositions of this invention are curable at room temperature. Because the cured product itself is not easily soiled and other materials around the cured product are not contaminated while the original adhesion is maintained, the compositions of this invention can be widely used as sealing materials, caulking materials, coating materials, and adhesives when the cured product is obtained in rubber form. If the cured product is hard and does not exhibit rubbery elasticity, the compositions of this invention are useful as coating materials and structural adhesives.

Examples and reference examples are described in the following. "Parts" in these examples denotes "parts by weight." The viscosity data and other experimental data were determined at 25° C.

REFERENCE EXAMPLE 1

Preparation of an organosulfonate-containing silane (Compound A)

3-Glycidoxypropyltrimethoxysilane (SH-6040 by Toray Silicone Company, LTD., 236 g, 1 mole), sodium bisulfite (114.4 g, 1.1 mole), sodium sulfite (4.4 g, 0.035 mole), and ion-exchanged water (350 g) were placed in a 1 L three-neck flask and a reaction was carried out for 2 hours while stirring the mixture at 75° C. When the obtained reaction mixture was poured into 5 L of acetone with stirring, a white precipitate was obtained.

The white precipitate was separated and analyzed and identified as a compound with the formula

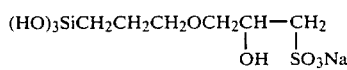

REFERENCE EXAMPLE 2

Preparation of an organosulfonate-containing polysiloxane (Compound B)

(1) Preparation of a 3-glycidoxypropyltrimethoxysilane hydrolysate

3-Glycidoxypropyltrimethoxysilane (SH-6040 by Toray Silicone Company, Ltd., 708 g, 3 moles), ion-exchanged water (27 g, 1.5 moles), and acetic acid (0.1 g) were placed in a 1 L three-neck flask equipped with a stirrer and the mixture was stirred at 90° C. for 2 hours. According to the analytical data, the major components in the reaction product was a trimerization product produced by an alcohol-liberating condensation between the methoxy groups in the above-mentioned silane.

(2) Introduction of the sulfonate group into the 3-glycidoxypropyltrimethoxysilane hydrolysate The above-mentioned hydrolysate (262 g) and ethanol (100 g) were placed in a 1 L three-necked flask equipped with stirrer. Subsequently, sodium bisulfite (38 g) and sodium sulfite (4.41 g) were dissolved in ion-exchanged water (300 g) and the aqueous solution was added to the mixture mentioned above. The reaction was carried out at 75° C. for 2 hours with stirring. The obtained reaction product was poured into 5 L of acetone. As a result, a white, sticky solid-like precipitate was produced. This solid-like precipitate was separated and analyzed. The sulfur atom of the sodium sulfonate group was found to be bonded to the -carbon relative to the hydroxyl group produced by the ring opening of the epoxy group in the above-mentioned 3-glycidoxypropyltrimethoxysilane hydrolysate.

REFERENCE EXAMPLE 3

Preparation of an organosulfonate-containing polysiloxane (Compound C)

An epoxy-containing polysiloxane with the following formula

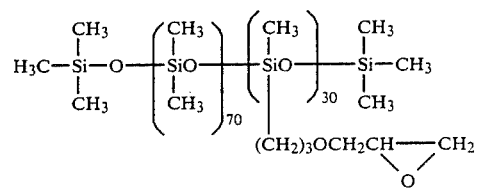

(15.6 g, 0.0015 mole), ethanol (31.2 g), and ion-exchanged water (4.0 g) were placed in a 300 mL three-neck flask equipped with stirrer. Separately, sodium bisulfite (5.15 g, 0.0495 mole), sodium sulfite (0.2 g, 0.00158 mole), and ion-exchanged water (27.2 g) were placed in an addition funnel and dissolved to homogeneity. The mixture was added dropwise over 1 hour. After the addition of the mixture, the reaction mixture was continuously stirred for 7 hours. The temperature was then elevated to 70° C. and the mixture was stirred for another 2 hours and then a mixed phase of ethanol and water was removed. The paste-like residue was analyzed. It was identified as an compound with the following formula

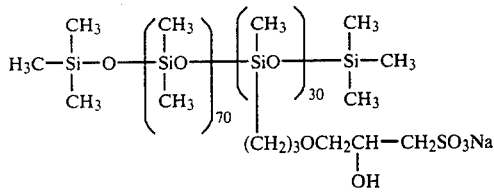

EXAMPLES 1 THROUGH 3

An α, ω-dihydroxypolydimethylsiloxane with a viscosity of 0.015 m²/s (100 parts) and the Compound A, Compound B, or Compound C (10 parts) prepared in Reference Examples 1 through 3 were mixed. Subsequently, a calcium carbonate filler with an average particle size of 1.4 μm (110 parts) was added and a homogeneous composition was prepared. n-Propyl orthosilicate (5 parts) and dibutyltin dilaurate (0.3 parts) were added to this composition and the mixture was blended to homogeneity and then defoamed. Test specimens for the tensile adhesion test based on JIS A 5758 were prepared using the room temperature-curable polyorganosiloxane composition prepared above. The adhesion substrate was a glass plate or aluminum plate whose surface had been treated with a silane primer. The room-temperature curable polyorganosiloxane composition was filled into a joint (width: 20 mm, depth: 10 mm) formed by facing two sheets of enamel-finished iron plate or white ceramic board and cured at 25° C. After curing, the cured product was left standing outdoors at an angle of 75°. After curing at 25° C. for one month, a sample was immersed in warm water at 50° C. for 7 days. Table 1 reports the results of the tensile adhesion test for the tensile adhesion test specimens and the results of an examination after 6 months outdoors for the degree of soiling of the surfaces for the enamel-finished iron plate and white ceramic board and of the sealant surface.

For comparison, a room temperature-curable polyorganosiloxane composition was also prepared under the same reaction conditions without the addition of the Compound A, Compound B, or Compound C prepared in Reference Examples 1 to 3. A room temperature-curable polyorganosiloxane composition was also prepared under the same reaction conditions with the addition of a polyether/polysiloxane copolymer (10 parts) expressed by the formula below in place of the Compound A, Compound B, and Compound C. The same tensile adhesion test was conducted and the degree of soiling was examined. The results are summarized in Table 1.

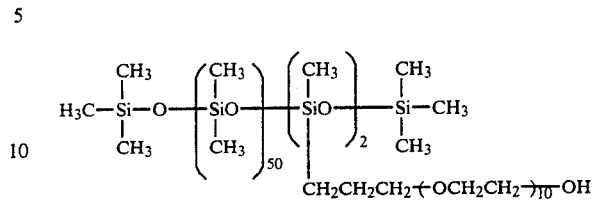

EXAMPLES 4 THROUGH 7

An α, ω-dihydroxypolydimethylsiloxane with a viscosity of 0.03 m²/s (100 parts), Compound B in Reference Example 2 (5 parts) and a fumed silica with a surface area of 200 m²/g (10 parts) were mixed to obtain a homogeneous composition. The organosilicon compound (8 parts) reported in Table 2 and, as desirable, the curing accelerator reported in Table 2, were mixed into the above-mentioned composition under nitrogen gas to obtain a homogeneous mixture. The volatiles were subsequently removed under reduced pressure. The room temperature-curable polyorganosiloxane compositions obtained as above were tested as in Examples 1 through 3. The test results are reported in Table 2.

EXAMPLE 8

An α, ω-dihydroxypolydimethylsiloxane with a viscosity of 0.004 m²/s (100 parts) was mixed with the Compound A prepared in Reference Example 1. Subsequently, a calcium carbonate filler with an average particle size of 0.5 μm (100 parts) was added to obtain a homogeneous composition. 1,3-Bis(diethylaminoxy)-2,4-diethyl-1,2,3,4-tetramethyltetracyclosiloxane (2.0 parts) and 1,2,3,4-tetra(diethylaminoxy)-1,2,3,4-tetramethyltetracyclosiloxane (0.3 parts) were carefully mixed into the above-mentioned composition to homogeneity without causing foaming. The same tests as in Examples 1 to 3 were conducted on the room temperature-curable polyorganosiloxane composition obtained as above. The test results are presented in Table 3. For comparison, a room temperature-curable polyorganosiloxane composition was prepared without the addition of Compound A and the same tests were conducted. The results are also reported in Table 3.

TABLE 1

| | | | Results of tensile adhesion test | | Results of examination of the degree of soiling | | |
|---|---|---|---|---|---|---|---|
| | Additives | Adhesion Substrate | Maximum stress kg/cm² | Cohesive failure (%) | Silicone rubber surface | Enamel-finished iron plate surface | White ceramic board surface |
| Example 1 | Compound A | Glass Aluminum | 10.5 10.6 | 100 100 | slightly stained | slightly stained | slightly stained |
| Example 2 | Compound B | Glass Aluminum | 10.2 10.1 | 100 100 | slightly stained | slightly stained | slightly stained |
| Example 3 | Compound C | Glass Aluminum | 8.2 8.0 | 100 100 | slightly stained | slightly stained | slightly stained |
| Comparison Example 1 | None | Glass Aluminum | 9.4 9.8 | 100 100 | blackish brown stains over entire surface | many stain strips | many stain strips |
| Comparison Example 2 | Polyether/polysiloxane copoly- | Glass Aluminum | 0.5 3.3 | 0 0 | slightly stained | slightly stained | slightly stained |

TABLE 1-continued

| | | Results of tensile adhesion test | | Results of examination of the degree of soiling | | |
|---|---|---|---|---|---|---|
| Additives | Adhesion Substrate | Maximum stress kg/cm² | Cohesive failure (%) | Silicone rubber surface | Enamel-finished iron plate surface | White ceramic board surface |
| mer | | | | | | |

TABLE 2

| | Organosilicon compound | Curing accelerator | Adhesion Substrate | Results of tensile adhesion test | | Results of examination of the degree of soiling | | |
|---|---|---|---|---|---|---|---|---|
| | | | | Maximum stress kg/cm² | Cohesive failure (%) | Silicone rubber surface plate surface | Enamel-finished iron | White ceramic board surface |
| Example 4 | Vinyltri-(methyl ethyl ketoximo)silane | — | Glass Aluminum | 9.6 9.7 | 100 100 | slightly stained | slightly stained | slightly stained |
| Example 5 | Methyltri-(methyl ethyl ketoximo)silane | Dibutyltin dioctoate (0.16 parts) | Glass Aluminum | 9.8 9.7 | 100 100 | slightly stained | slightly stained | slightly stained |
| Example 6 | Methyltri-methoxy-silane | Tetrabutyl titanate (2.0 parts) | Glass Aluminum | 9.0 9.1 | 100 100 | slightly stained | slightly stained | slightly stained |
| Example 7 | Vinyltri-acetoxy silane | — | Glass Aluminum | 10.2 10.3 | 100 100 | slightly stained | slightly stained | slightly stained |

TABLE 3

| | Additives | Adhesion Substrate | Results of tensile adhesion test | | Results of examination of the degree of soiling | | |
|---|---|---|---|---|---|---|---|
| | | | Maximum stress kg/cm² | Cohesive failure (%) | Silicone rubber surface | Enamel-finished iron plate surface | White ceramic board surface |
| Example 1 | Compound A | Glass Aluminum | 5.8 5.7 | 100 100 | slightly stained | slightly stained | slightly stained |
| Comparison Example | None | Glass Aluminum | 5.6 5.4 | 100 90 | blackish brown stains over entire surface | many stain strips | many stain strips |

That which is claimed is:

1. A polyorganosiloxane composition comprising the product obtained by mixing
(A) 100 parts by weight of a polyorganosiloxane having at least two silicon-bonded hydroxyl radicals or at least two silicon-bonded hydrolyzable groups per molecule,
(B) an amount of an organosilicon compound sufficient to make the composition room temperature curable, said organosilicon compound having at least two silicon-bonded hydrolyzable groups per molecule, where the total number of silicon-bonded hydroxyl radicals or silicon-bonded hydrolyzable groups per molecule in the polyorganosiloxane of (A) and silicon-bonded hydrolyzable groups per molecule of (B) exceeds 4.0, and
(C) 0.5 to 50 parts by weight of an organosulfonate-containing silicon compound.

2. The polyorganosiloxane composition according to claim 1 in which the organosulfonate-containing silicon compound, (C), is an organosulfonate-containing silane.

3. The polyorganosiloxane composition according to claim 2 in which the organosulfonate-containing silane is expressed by the formula $$M(O_3S-R-SiR'_3)_x$$

in which M represents a monovalent metal ion or a divalent metal ion, R represents a divalent organic radical in which a hydroxyl radical is bonded to the carbon atom adjacent to the carbon atom bonded to the sulfur atom of the sulfonate group, R' represents a monovalent hydrocarbon radical, a monovalent halogenated hydrocarbon radical, a hydrocarboxy radical, or the hydroxyl radical, and x is a value equal to the ionic valence of the metal ion M.

4. The polyorganosiloxane composition according to claim 3 in which the polyorganosiloxane of (A) is a polydiorganosiloxane having a viscosity in the range of 0.0003 to 0.3 m²/s and (C) is present in an amount of from 1 to 20 parts by weight.

5. The polyorganosiloxane composition according to claim 4 in which the polydiorganosiloxane is a hydroxyl endblocked polydimethylsiloxane having a viscosity of 0.001 to 0.05 m²/s.

6. The polyorganosiloxane composition according to claim 5 in which the organosilicon compound of (B) is n-propylorthosilicate, the organosulfonate-containing silicon compound is

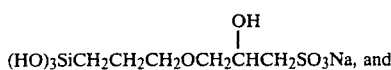
(HO)₃SiCH₂CH₂CH₂OCH₂CHCH₂SO₃Na, and there is present calcium carbonate filler, and dibutyltindilaurate.

7. The polyorganosiloxane composition according to claim 5 in which the organosulfonate-containing silicon compound is

(HO)₃SiCH₂CH₂CH₂OCH₂CHCH₂SO₃Na, the organosilicon compound of (B) is a mixture of

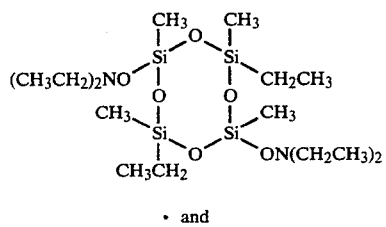

and

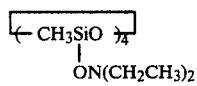

and there is present calcium carbonate.

8. The polyorganosiloxane composition according to claim 1 in which the organosulfonate-containing silicon compound of (C) is an organosulfonate-containing polysiloxane.

9. The polyorganosiloxane composition according to claim 8 in which the organosulfonate-containing polysiloxane contains at least one siloxane unit per molecule expressed by the formula

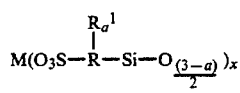

in which M represents a monovalent metal ion or a divalent metal ion, R represents a divalent organic radical in which a hydroxyl radical is bonded to the carbon atom adjacent to the carbon atom bonded to the sulfur atom of the sulfonate group, R¹ represents a monovalent hydrocarbon radical, a monovalent halogenated hydrocarbon radical, a hydrocarbonoxy radical, or the hydroxyl radical, x is a value equal to the ionic valence of the metal ion M, and a is 0,1, or 2.

10. The polyorganosiloxane composition according to claim 9 in which the polyorganosiloxane of (A) is a polydiorganosiloxane having a viscosity in the range of 0.0003 to 0.3 m²/s and (C) is present in an amount of from 1 to 20 parts by weight.

11. The polyorganosiloxane composition according to claim 10 in which the polydiorganosiloxane is a hydroxyl endblocked polydimethylsiloxane having a viscoisity of 0.001 to 0.05 m²/s.

12. The polyorganosiloxane composition according to claim 11 in which the organosulfonate-containing compound is a sulfonated hydrolyzate of

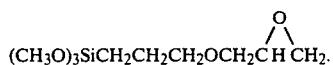

13. The polyorganosiloxane composition according to claim 11 in which the organosulfonate-containing compound is

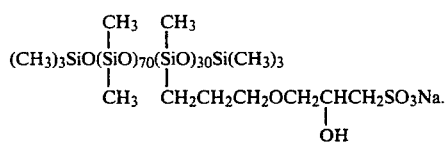

14. The polyorganosiloxane composition according to claim 12 in which the organosilicon compound of (B) is n-propylorthosilicate and there is present calcium carbonate filler and dibutyltindilaurate.

15. The polyorganosiloxane composition according to claim 13 in which the organosilicon compound of (B) is n-propylorthosilicate and there is present calcium carbonate filler and dibutyltindilaurate.

16. The polyorganosiloxane composition according to claim 12 in which the organosilicon compound of (B) is

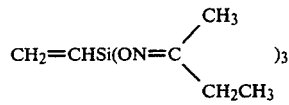

and there is present fumed silica filler.

17. The polyorganosiloxane composition according to claim 12 in which the organosilicon compound of (B) is

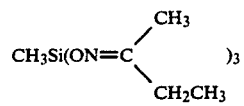

and there is present fumed silica filler and dibutyltin dioctoate.

18. The polyorganosiloxane composition according to claim 12 in which the organosilicon compound of (B) is methyltrimethoxysilane and there is present fumed silica filler and tetrabutyltitanate.

19. The polyorganosiloxane composition of claim 12 in which the organosilicon compound of (B) is vinyltriacetoxysilane and there is fumed silica filler present.

20. The polyorganosiloxane composition according to claim 1 in which the product is packaged in a moisture excluding container from which the product can be extruded and will cure in contact with moisture.

* * * * *

UNITED STATES PATENT AND TRADEMARK OFFICE
CERTIFICATE OF CORRECTION

PATENT NO. : 4,486,566

DATED : 12/4/84

INVENTOR(S) : Katsuyoshi Nakasuji and Toshio Saruyama

It is certified that error appears in the above-identified patent and that said Letters Patent is hereby corrected as shown below:

In Column 2, line 1, the words "organosulfonate- con-" should read "organosulfonate-con-".

In Column 2, line 22, the word "2-phenyl-ethyl" should read "2-phenylethyl".

In Column 3, line 8, the word "n-propxy" should read "n-propoxy".

In Column 3, line 57, the word "an" should read "and".

In Column 4, line 3, the word "vinlytriacetoxysilane" should read "vinyltriacetoxysilane".

In Column 5, line 59, the word "proponoxy" should read "propoxy".

In Column 6, line 16, the word "epoxysubstituted" should read "epoxy-substituted".

In Column 8, line 67, the word "an" should read "a".

In Column 11, line 65, the words "silicon- bonded" should read "silicon-bonded".

In Column 14, line 7, the word "coisity" should read "cosity".

Signed and Sealed this

Twenty-eighth Day of January 1986

[SEAL]

Attest:

DONALD J. QUIGG

Attesting Officer

Commissioner of Patents and Trademarks